US011574285B2

(12) United States Patent
Wang et al.

(10) Patent No.: US 11,574,285 B2
(45) Date of Patent: *Feb. 7, 2023

(54) INTELLIGENT PREDICTION OF BUNDLES OF SPARE PARTS

(71) Applicant: THE BOEING COMPANY, Chicago, IL (US)

(72) Inventors: Zhennong Wang, Bellevue, WA (US); Yun Shi, Bellevue, WA (US)

(73) Assignee: The Boeing Company, Chicago, IL (US)

(*) Notice: Subject to any disclaimer, the term of this patent is extended or adjusted under 35 U.S.C. 154(b) by 66 days.

This patent is subject to a terminal disclaimer.

(21) Appl. No.: 17/175,991

(22) Filed: Feb. 15, 2021

(65) Prior Publication Data
US 2021/0182788 A1 Jun. 17, 2021

Related U.S. Application Data

(63) Continuation of application No. 16/145,731, filed on Sep. 28, 2018, now Pat. No. 10,922,650.

(51) Int. Cl.
G06Q 10/08 (2012.01)
G06Q 30/02 (2012.01)
G06Q 30/08 (2012.01)
G06Q 30/06 (2012.01)
G06Q 10/06 (2012.01)

(52) U.S. Cl.
CPC ....... G06Q 10/0875 (2013.01); G06Q 10/063 (2013.01); G06Q 30/0201 (2013.01); G06Q 30/0202 (2013.01); G06Q 30/0633 (2013.01); G06Q 10/0838 (2013.01)

(58) Field of Classification Search
None
See application file for complete search history.

(56) References Cited

U.S. PATENT DOCUMENTS

| 6,058,227 | A | 5/2000 | Wong |
| 8,185,446 | B1 | 5/2012 | Kuznetsova et al. |
| 8,401,986 | B1 | 3/2013 | Franke |
| 10,387,922 | B2 | 8/2019 | Gopalsamy et al. |
| 10,521,812 | B2 | 12/2019 | Pirnack et al. |
| 10,922,650 | B2 * | 2/2021 | Wang ................. G06Q 30/0201 |
| 11,250,377 | B2 * | 2/2022 | Cappitelli ............. G06Q 50/28 |

(Continued)

OTHER PUBLICATIONS

Rezig, S., et al., "Using Data Mining Methods for Predicting Sequential Maintenance Activities," Applied Sciences 8.11 MDPI AG. (Nov. 2018). (Year: 2018).*

(Continued)

Primary Examiner — Nicholas D Rosen
(74) Attorney, Agent, or Firm — Patterson + Sheridan, LLP

(57) ABSTRACT

Techniques for intelligently predicting bundles of replacement parts. A plurality of maintenance events for a plurality of replacement parts are determined based on historical data related to the plurality of replacement parts. Each maintenance event of the plurality of maintenance events corresponds with one or more of the replacement parts. A plurality of clusters of replacement parts are generated based on the plurality of maintenance events. A plurality of bundles of replacement parts are predicted based on the clusters. Each bundle includes a plurality of replacement parts.

20 Claims, 10 Drawing Sheets

(56) References Cited

U.S. PATENT DOCUMENTS

| | | |
|---|---|---|
| 2012/0226573 A1 | 9/2012 | Zakas et al. |
| 2014/0279169 A1 | 9/2014 | Leos |
| 2014/0358665 A1 | 12/2014 | Gopalsamy et al. |
| 2017/0345040 A1 | 11/2017 | Pirnack et al. |
| 2020/0042930 A1 | 2/2020 | Cappitelli et al. |

OTHER PUBLICATIONS

European Patent Office Examination Report for Application No. 19 195 084.9-1222 dated Feb. 22, 2021.
European Patent Office Extended European Search Report for Application No. 19195084.9-1222 dated Oct. 2, 2019.
European Patent Office, Summons to attend oral proceedings pursuant to Rule 115(1) EPC for Application 19 195 084.9 dated Nov. 5, 2021, pp. 1-10.

* cited by examiner

| | EVENT A | EVENT B | EVENT C | EVENT D | EVENT E |
|---|---|---|---|---|---|
| PART 1 | 1 | 0 | 0 | 0 | 1 |
| PART 2 | 0 | 0 | 0 | 0 | 1 |
| PART 3 | 1 | 1 | 1 | 1 | 0 |
| PART 4 | 0 | 1 | 1 | 1 | 0 |
| PART 5 | 0 | 1 | 1 | 1 | 0 |
| PART 6 | 1 | 1 | 0 | 1 | 1 |
| PART 7 | 1 | 1 | 1 | 0 | 0 |
| PART 8 | 0 | 0 | 1 | 1 | 1 |

INTELLIGENT PREDICTION OF BUNDLES OF SPARE PARTS

CROSS-REFERENCE TO RELATED APPLICATIONS

This application is a continuation of co-pending U.S. application Ser. No. 16/145,731, filed Sep. 28, 2018, which is hereby incorporated by reference in its entirety.

FIELD

Aspects of the present disclosure provide techniques for intelligent prediction of bundles of parts.

BACKGROUND

Companies that maintain a fleet of vehicles often need spare parts for their vehicles. For example, airlines need spare parts to maintain their airplanes and to meet regulatory and safety requirements. These spare parts can be provided by Original Equipment Manufacturers (OEMs) or third party resellers. An airline can purchase the necessary spare parts using a search tool, for example an Internet based search tool provided by the part seller. The airline will often purchase only the parts it needs for a specific maintenance task, to avoid unnecessary cost and storage of unused parts.

To accomplish this, many airlines employ purchase agents, who maintain a predefined set of parts, for purchase, to use in the desired maintenance task. Many factors can influence which parts the airline will purchase for a maintenance task, including: the aircraft type, the type of maintenance, the condition of the aircraft, the airline's existing inventory, contracts with part suppliers, etc. Often, these parts are available and sold to the airlines individually, even when the airline needs a bundle of several parts to complete the desired maintenance tasks. In some cases, OEMs may be disadvantaged in these individual part sales, based on price or other factors.

SUMMARY

Embodiments described herein include a computer-implemented method for intelligently predicting bundles of replacement parts. The method includes determining, using a computer processor, a plurality of maintenance events for a plurality of replacement parts, based on historical data related to the plurality of replacement parts. Each maintenance event of the plurality of maintenance events corresponds with one or more of the replacement parts. The determining includes identifying, using the computer processor, one or more replacement parts for a maintenance event, based on one or more replacement part events occurring within a time period related to the maintenance event. The method further includes generating, using the computer processor, a plurality of clusters of replacement parts based on the plurality of maintenance events. The method further includes predicting, using the computer processor, a plurality of bundles of replacement parts, based on the clusters. Each bundle includes a plurality of replacement parts.

Embodiments described herein further include a system. The system includes a processor and a memory storing a program, which, when executed on the processor, performs an operation. The operation includes determining a plurality of maintenance events for a plurality of replacement parts, based on historical data related to the plurality of replacement parts. Each maintenance event of the plurality of maintenance events corresponds with one or more of the replacement parts. The determining includes identifying one or more replacement parts for a maintenance event, based on one or more replacement part events occurring within a time period related to the maintenance event. The operation further includes generating a plurality of clusters of replacement parts based on the plurality of maintenance events. The operation further includes predicting a plurality of bundles of replacement parts, based on the clusters. Each bundle includes a plurality of replacement parts.

Embodiments described herein further include a computer program product for intelligently predicting bundles of replacement parts. The computer program product includes a computer-readable storage medium having computer-readable program code embodied therewith, the computer-readable program code executable by one or more computer processors to perform an operation. The operation includes determining a plurality of maintenance events for a plurality of replacement parts, based on historical data related to the plurality of replacement parts. The determining includes identifying one or more replacement parts for a maintenance event, based on one or more replacement part events occurring within a time period related to the maintenance event. Each maintenance event of the plurality of maintenance events corresponds with one or more of the replacement parts. The operation further includes generating a plurality of clusters of replacement parts based on the plurality of maintenance events. The operation further includes predicting a plurality of bundles of replacement parts, based on the clusters. Each bundle includes a plurality of replacement parts.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

Figure 1:
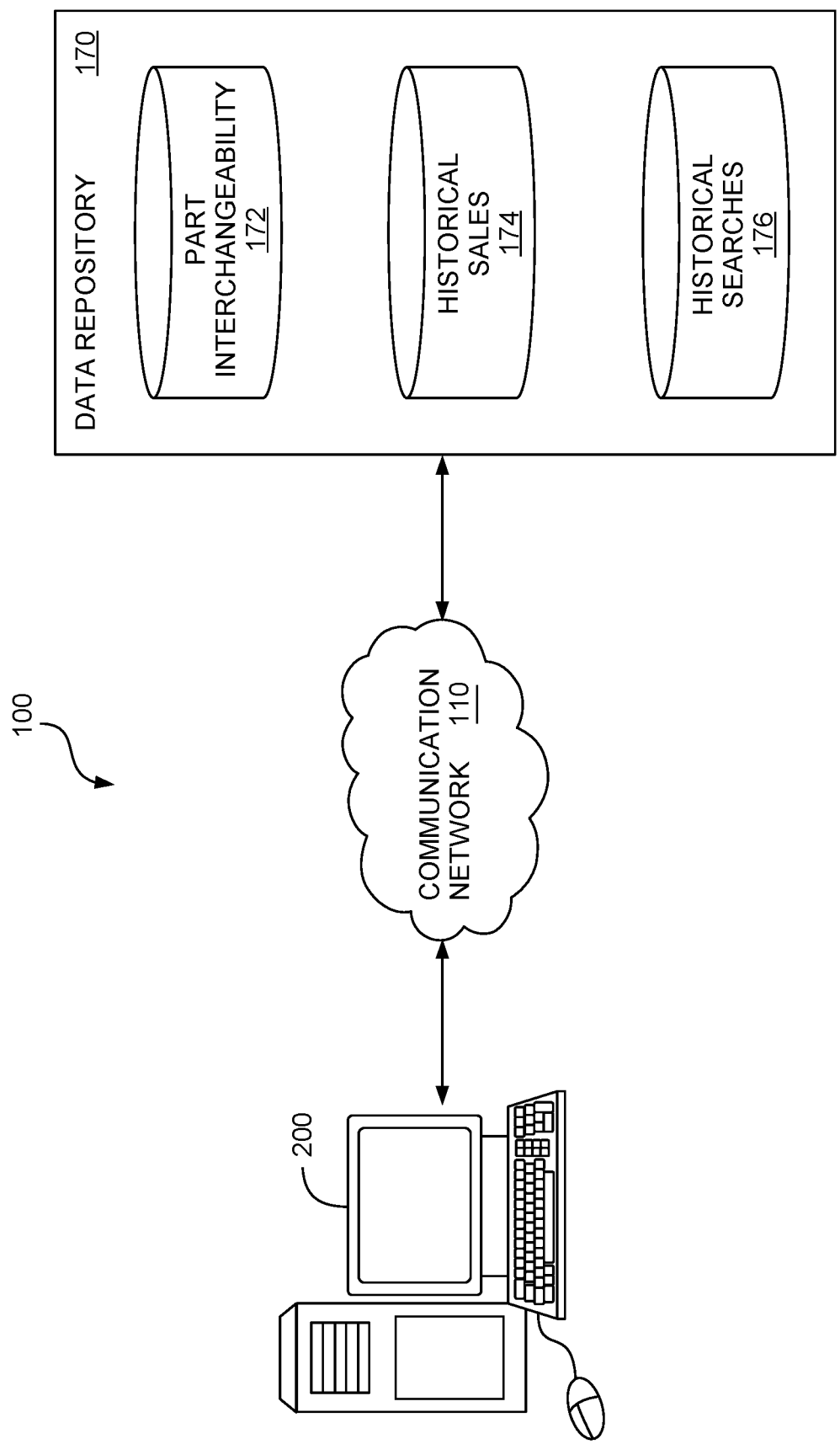
FIG. 1 is a block diagram illustrating intelligent prediction of spare part bundles, according to one embodiment described herein.

In addition to (or instead of) offering spare parts for sale individually, OEMs and other part sellers can sell bundles of parts targeted to a particular maintenance task. This is more convenient for the customer, because all the necessary parts for a task are provided together, and allows the part seller to more competitively price the parts, as a bundle. But the seller typically does not know which parts a customer will need, before the customer seeks the parts, and therefore does not know which parts should be bundled and offered for sale together.

Aspects of the present disclosure relate to techniques for intelligent prediction of spare part bundles by a computer. Relevant historical data about part sales and electronic searches can be identified using specific computerized techniques, and used to intelligently predict which parts an airline is likely to purchase together. This allows for reduced pricing of the part bundles, allowing a part seller to convert a higher number of sales. Further, the predicted bundles are more convenient for customers, and can assist a customer in recognizing parts that it should consider purchasing for a given task. In addition, certain techniques disclosed herein provide for efficient prediction of spare part bundles, limiting the computational resources needed. These techniques improve the operation of the computer by efficiently and effectively providing for intelligent prediction of spare part bundles.

The predicted bundles can be offered to customers in numerous ways. In one embodiment, the bundles can be listed for sale, as bundles, and a customer can select a desired bundle. In another embodiment, when a customer electronically searches for (or selects) a given part, bundles which contain that part are found, and additional parts from those bundles are offered to the customer. In an embodiment, the predicted bundles are maintained for a relatively long period of time (e.g., weeks, months, or even years), and do not change frequently. Further, in an embodiment, the predicted bundles are predictions of specific customer requirements for maintenance events.

The techniques discussed below can be particular effective for high value vehicles like airplanes, helicopters, etc. For example, as discussed below in relation to FIGS. 7-10, in an embodiment techniques described herein can be used to identify maintenance events during which a customer purchases several parts over a particular time period. The identified maintenance events can be used to predict bundles of parts. This is particularly applicable to airplanes and other high value vehicles because parts purchases for these vehicles are often predicable and well thought out by customers. For example, because commercial airplane parts are often expensive, many airlines practice relatively lean business strategies. The airlines only purchase the parts they need, and purchase the parts only on a regimented schedule or because of a documented need. The airlines generally do not make spur of the moment purchases. An effectively predicted bundle should take this into account.

The techniques described herein are particularly suitable for this environment, because they can identify parts purchased together in both circumstances: as part of a scheduled maintenance event (which can vary between customers) and as part of a recurring but unscheduled need. For example, the techniques described in relation to FIGS. 7-10 can identify maintenance events and predict part bundles related to scheduled maintenance, without requiring knowledge of each customer's maintenance schedule. That is, these techniques can predict bundles of parts without requiring access to a customer's maintenance or purchase schedule. Further, these techniques can identify parts that are purchased as part of an unscheduled maintenance event—for example, parts that often must be replaced at similar times, even when not scheduled for replacement together (e.g., because multiple vehicles may need replacement of the same parts at similar times, or because a need for one part may be a signal that another part will likely be needed). A bundle can be predicted even when a customer itself does not realize it will need to purchase the bundled parts together, and when no observer has recognized that the parts should be bundled.

Further, one or more of the techniques described herein are particularly applicable to well regulated industries, like commercial air travel. Governmental regulations will sometimes require changes to a part to comply with new or modified regulations. The modified part may be interchangeable with a previously available part, meaning, for example, that the new part can and should be used in place of the previously available part. As discussed in relation to FIG. 6, below, this interchangeability relationship can be used to accurately include the replacement part in a predicted bundles, even where the replacement part may not yet be included in historical sales.

The techniques discussed herein are not limited to high value vehicles like airplanes, helicopters, etc. They can be suitable to any number of industries and contexts. For example, some (or all) of the techniques described may be applicable to other transportation and freight industries that incorporate vehicles, including bus lines, taxi companies, shipping lines, cruise lines, rail lines, transit authorities, and many others. Further, some (or all) of the techniques described may be applicable to other industries, including factories, manufacturing facilities, and other suitable industries or contexts.

FIG. 1 is a block diagram illustrating a system 100 for intelligent prediction of spare part bundles, according to one embodiment described herein. A bundle prediction server 200 is connected to a communication network 110. The bundle prediction server 200 is described in more detail with regard to FIG. 2. The bundle prediction server 200 is generally configured to implement intelligent prediction of spare part bundles, along with pricing of the bundles.

The communication network 110 can be any suitable communication network, including the Internet, a local access network, or a wide access network. The communication network 110 can be a wired or wireless network. The communication network can use any suitable communication protocol, including any suitable wireless protocol. For example, the communication network 110 can use an Institute for Electrical and Electronics Engineers (IEEE) Wi-Fi standard, like an 802.11 standard, another Wi-Fi standard, a cellular protocol (including 3G, Long-Term Evolution (LTE), 4G and others), Bluetooth, and others. Further, the communication network 110 can use several different communication protocols.

The communication network 110 is further connected to the data repository 170. The data repository 170 can be any suitable data storage medium. For example, the data repository 170 can include a relational database, or any other suitable database. In an embodiment, the data repository 170 includes network interface software and hardware to allow for communication with the communication network 110. For example, the data repository 170 can include a server computer with a network interface. As another example, the data repository 170 could be included within the bundle prediction server 200. Alternatively, as discussed further below, the data repository 170 could be a cloud-based storage system, accessible via the communication network 110.

The data repository 170 includes data for use by the bundle prediction server 200 in intelligent prediction of spare part bundles, along with pricing the bundle. In the illustrated embodiment, the data repository 170 includes part interchangeability data 172. The part interchangeability 172 include data describing parts that can be considered interchangeable for each other. For example, an older spare part may be replaced by a new version with a different part number. This could be done in response to a change in governmental regulations, because of an improvement in manufacturing or materials, or for any number of reasons. The newer part may be considered interchangeable for the older part, so that a customer seeking to purchase the older part can be directed to the newer part. But the reverse may not be true—the newer part may have been refined, or improved, so that the older part is not considered interchangeable for the newer part. The part interchangeability 172 can include data describing this relationship.

The data repository 170 further historical sales 174. The historical sales 174 include, for example, data describing which parts have been sold, to which customers, at which times. The historical sales 174 can include any suitable information describing historical sales of parts, including part identifiers for the parts sold, customer information, pricing information, date information, and other relevant information. The data repository 170 further includes historical searches 176. The historical searches 176 include, for example, data about which parts a customer has electronically searched for (e.g., based on a part identifier), at what time, whether or not the customer chose to purchase the parts. In some situations, a customer will electronically search for parts but choose not to purchase them. For example, a customer might use an OEM search tool to identify which parts it would like to purchase, but might purchase the parts from a third party seller. The historical searches 176 capture customers' electronic searches for parts, whether or not the customer chooses to purchase the parts. In an embodiment, the historical searches 176 can include information describing whether a given electronic search ended up resulting in a sale. The illustrated data in the data repository 170 are merely examples, and other data can also be included.

Figure 2:
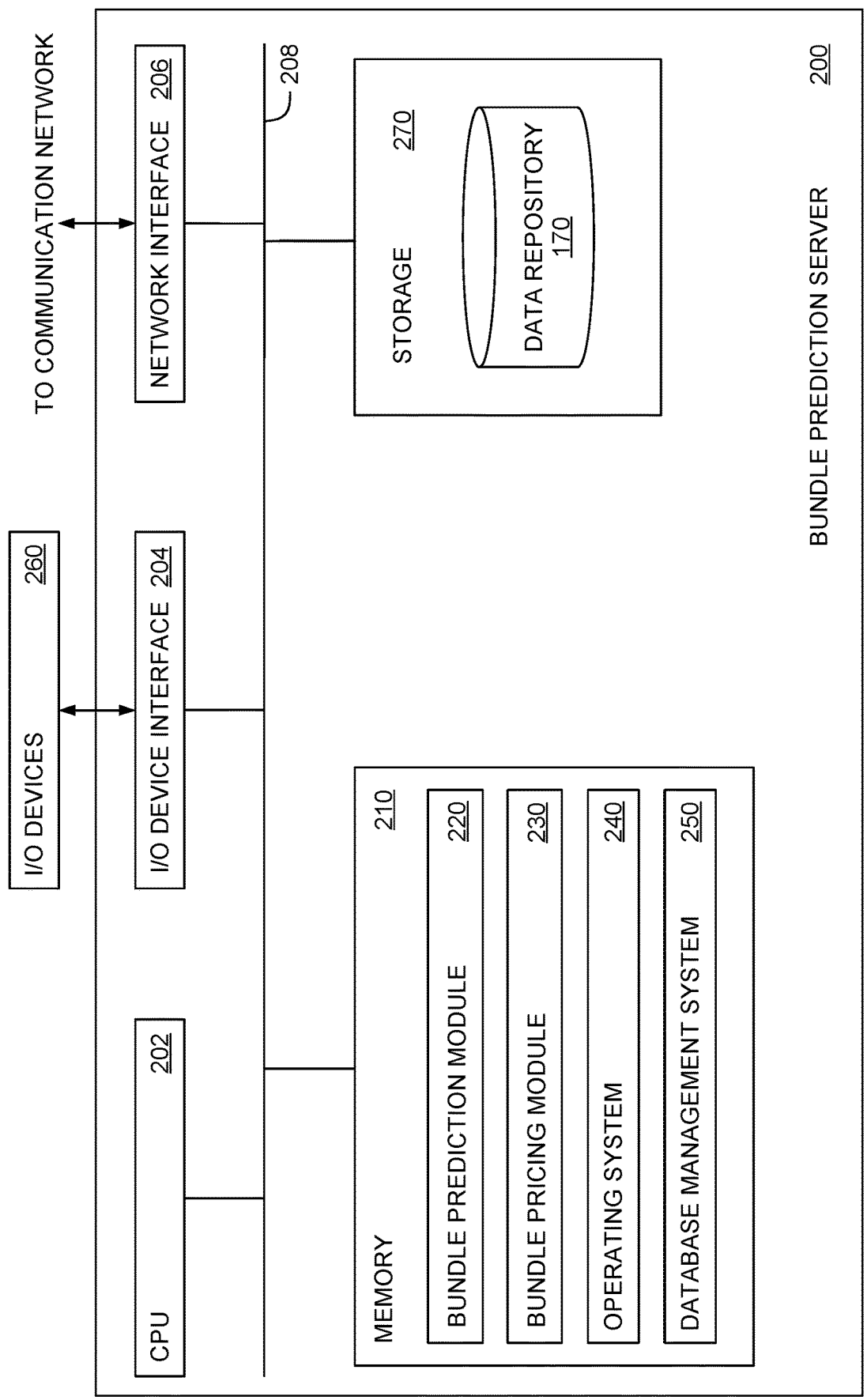
FIG. 2 is a block diagram illustrating a bundle prediction server, according to one embodiment described herein.

FIG. 2 is a block diagram illustrating a bundle prediction server 200, according to one embodiment described herein. As shown, the bundle prediction server 200 includes, without limitation, a central processing unit (CPU) 202, a network interface 206, a memory 210, and storage 270, each connected to a bus 208. In an embodiment, the bundle prediction server 200 also includes an Input/Output (I/O) device interface 204 for connecting to I/O devices 260. In an embodiment, the I/O devices 260 can be external I/O devices (e.g., keyboard, display and mouse devices). Alternatively, the I/O devices 260 can be built in I/O devices (e.g., a touch screen display or touchpad). Further, in context of this disclosure, the computing elements shown in the bundle prediction server 200 may correspond to a physical computing system (e.g., a system in a data center) or may be a virtual computing instance executing within a computing cloud, as discussed further below.

The CPU 202 retrieves and executes programming instructions stored in the memory 210 as well as stores and retrieves application data residing in the storage 270. The bus 208 is used to transmit programming instructions and application data between the CPU 202, the I/O device interface 204, the storage 270, the network interface 206, and the memory 210. The CPU 202 is included to be representative of a CPU, multiple CPUs, a single CPU having multiple processing cores, graphics processing units (GPUs) having multiple execution paths, and the like. The memory 210 is generally included to be representative of electronic storage of any suitable type(s), including random access memory or non-volatile storage. The storage 270 may be a disk drive storage device. Although shown as a single unit, the storage 270 may be a combination of fixed and/or removable storage devices, such as fixed disc drives, removable memory cards, network attached storage (NAS), or a storage area-network (SAN).

Illustratively, the memory 210 includes an operating system 240 and a database management system (DBMS) 250, while the storage 270 includes a data repository 170 (e.g., a database). The operating system 240 generally controls the execution of application programs on the bundle prediction server 200. Examples of operating system 240 include, without limitation, versions of UNIX, distributions of the Linux® operating system, versions of Microsoft® Windows® and so on. The DBMS 250 generally facilitates the capture and analysis of data in the data repository 170 (e.g., spare part data). For instance, the DBMS 250 could enable the definition, creation, querying, update and administration of the data repository 170. As an example, the DBMS 250 could receive a query (e.g., composed using Structured Query Language (SQL)) and, in response, could generate an execution plan that includes one or more access routines to be run against the data repository 170. The DBMS 250 could then execute the access routine(s) and could return any query result data to the requestor.

The memory 210 generally includes program code for performing various functions related to intelligent prediction of spare part bundles, along with pricing the bundles. The program code is generally described as various functional "applications," "components," or "modules" within the memory 210, although alternate implementations may have different functions and/or combinations of functions. Within the memory 210, the bundle prediction module 220 is generally configured to intelligently predict bundles of spare parts. This is described further with regard to FIGS. 3-9.

The memory 210 further includes a bundle pricing module 230. The bundle pricing module 230 is generally configured to determine prices for the bundles predicted by the bundle prediction module 220. In an embodiment, this can be done automatically based on historical data (e.g., data in the data repository 170). Alternatively, this can be done based partially, or completely, on input from a subject matter expert or other user.

Figure 3:
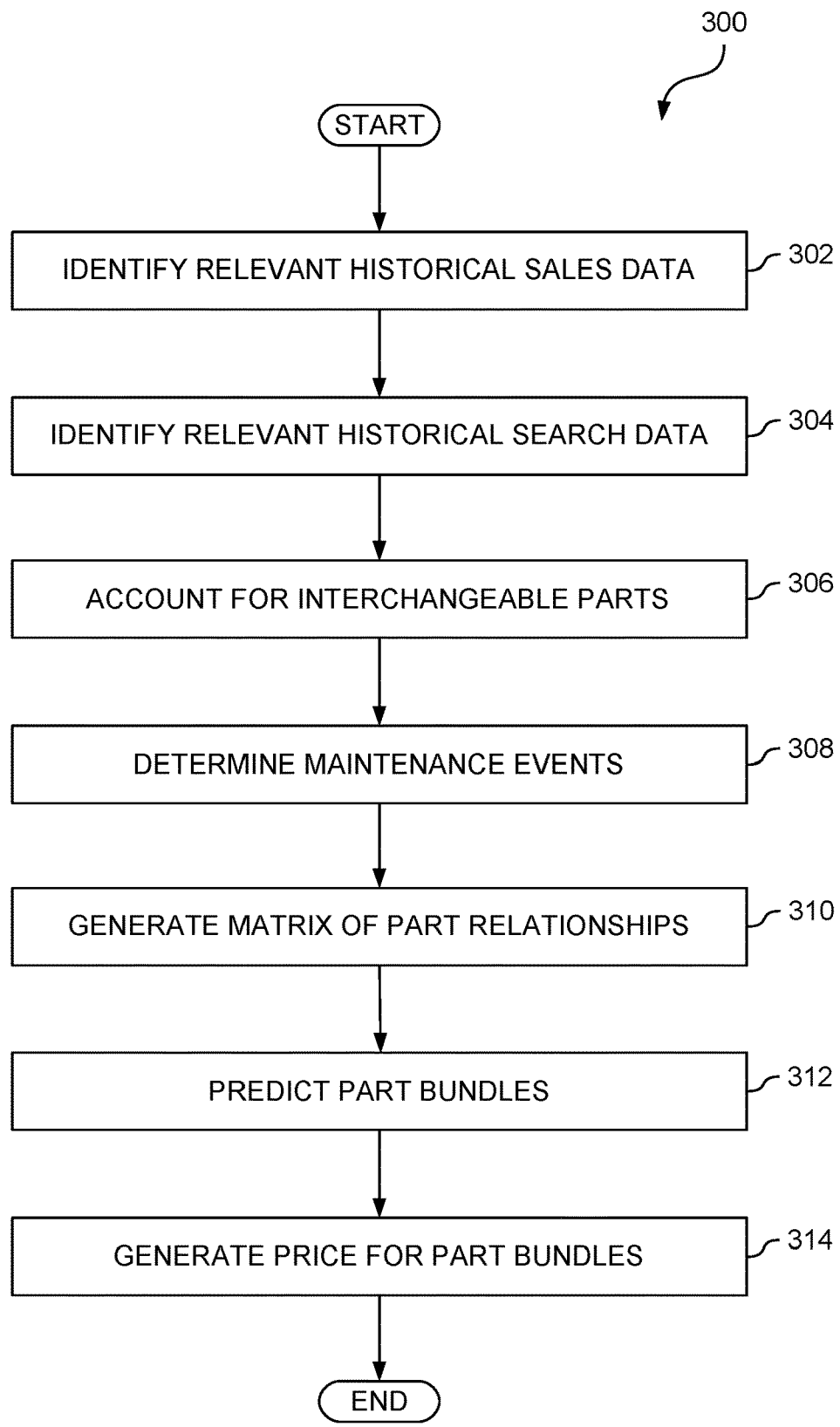
FIG. 3 is a flow chart illustrating intelligent prediction of spare part bundles, according to one embodiment described herein.

FIG. 3 is a flow chart 300 illustrating intelligent prediction of spare part bundles according to one embodiment described herein. At block 302, a bundle prediction module (e.g., the bundle prediction module 220 illustrated in FIG. 2) identifies relevant historical sales data (e.g., the historical sales data 174 illustrated in FIG. 1) for use in intelligent prediction of spare part bundles. In an embodiment, the bundle prediction module 220 selects a subset of relevant historical sales data 174 for use in the intelligent prediction. This is illustrated further in relation to FIG. 4.

At block 304, a bundle prediction module (e.g., the bundle prediction module 220 illustrated in FIG. 2) identifies relevant historical search data (e.g., the historical search data 176 illustrated in FIG. 1) for use in intelligent prediction of spare part bundles. In an embodiment, the bundle prediction module 220 selects a subset of relevant historical search data 176 for use in the intelligent prediction. This is illustrated further in relation to FIG. 5.

At block 306, a bundle prediction module (e.g., the bundle prediction module 220 illustrated in FIG. 2) accounts for interchangeable parts for use in prediction of spare part bundles. In an embodiment, the bundle prediction module 220 uses data about the interchangeability of spare parts (e.g., the part interchangeability 172 illustrated in FIG. 1) to determine which parts are interchangeable for purposes of predicting spare part bundles. This is illustrated further in relation to FIG. 6.

At block 308, a bundle prediction module (e.g., the bundle prediction module 220 illustrated in FIG. 2) determines maintenance events for use in predicting spare part bundles. In an embodiment, an airline (or other purchaser) may purchase, or electronically search for, parts related to a specific maintenance event in a series of transactions. That is, instead of purchasing (or searching for) the spare parts used for a particular event all at once, the airline may purchase the parts over a series of hours, days, weeks, or even months. In an embodiment, the parts used for this event should be bundled together, but the time period during which the airline was purchasing (or searching for) related parts is not known. In an embodiment, the bundle prediction module 220 uses the historical sales 174 and historical searches 176 to identify the time periods during which a customer's activities were related a particular maintenance event. This is described in more detail in relation to FIG. 7.

At block 310, a bundle prediction module (e.g., the bundle prediction module 220 illustrated in FIG. 2) generates a matrix of relationships between spare parts, for use in predicting bundles of spare parts. In an embodiment, the maintenance events determined at block 308 can be used to generate a matrix (e.g., a binary matrix) describing relationships between spare parts. This is described in more detail in relation to FIG. 8. At block 312, a bundle prediction module (e.g., the bundle prediction module 220 illustrated in FIG. 2) predicts bundles of spare parts using the matrix generated at block 310. This is described in more detail in relation to FIG. 9.

At block 314, a bundle pricing module (e.g., the bundle pricing module 230 illustrated in FIG. 2) generates a price for the part bundles predicted at block 312. In an embodiment, the bundle pricing module 230 can automatically generate the price of the bundle based on, for example, pricing information for the individual components, historical sales data, and characteristics of the parts (e.g., the age of the destination vehicle, the popularity of the part, etc.). In an embodiment, bundle prices are relatively stable, and unlikely to change frequently. In another embodiment, bundle prices can change dynamically based on numerous factors, including customer demand, the prices and costs of the individual parts in the bundle, sales targets, etc.

In one example, the bundle pricing module 230 can consider the price of each individual part in a bundle, and apply a discount to the combined price. This can be a set discount (e.g., a percentage of the total price) or can be determined based on the underlying cost and desired profit or profit margin from sale of the bundle. In an embodiment, offering the bundle for sale together allows for a discounted rate, because of the larger number of individual parts and relatively larger sales price of the bundle. As another example, the bundle pricing module 230 can consider historical sales data (e.g., historical sales 174 illustrated in FIG. 1) when generating the bundle price. As another example, the bundle pricing module 230 can consider characteristics of the parts in the bundle when generating the bundle price. For example, if the bundle relates to a relatively older, but common, model of vehicle (e.g., an older model of airplane), the bundle price could be lowered accordingly. Alternatively, if the bundle relates to a relatively rare vehicle, the price could be kept relatively higher. Similarly, if the bundle relates to relatively popular or off-the-shelf parts, the bundle price could be lowered. If the bundle relates to special order or more rare parts, the bundle price could be raised.

In another embodiment, the bundle pricing module 230 can rely on user input to generate a price for the bundles. For example, a subject matter expert (or other user) could be prompted to enter a price for the bundle. Alternatively, the bundle pricing module 230 can combine user input with automatic pricing. For example, a user could provide upper and lower boundaries for the price, a desired discount rate, a target profit amount or profit margin, etc. The bundle pricing module 230 can use this user input to generate pricing for the bundles.

Figure 4:
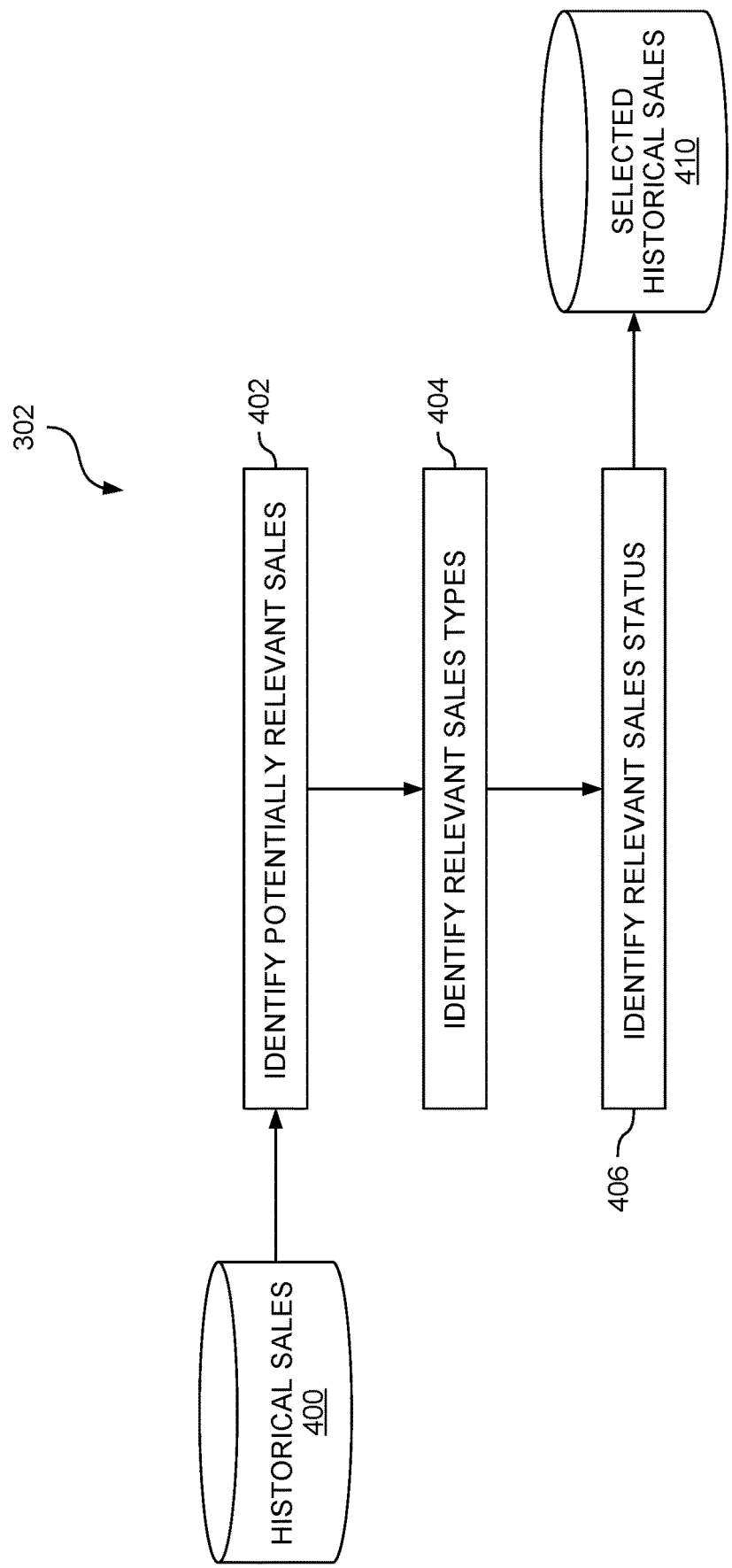
FIG. 4 is a flow chart illustrating identifying relevant historical part sales data, according to one embodiment described herein.

FIG. 4 is a flow chart illustrating identifying relevant historical part sales data according to one embodiment described herein. In an embodiment, FIG. 4 corresponds with block 302 illustrated in FIG. 3. At block 402, the bundle prediction module (e.g., the bundle prediction module 220 illustrated in FIG. 2) receives the historical sales data 400 (e.g., the historical sales 174 illustrated in FIG. 4) and identifies potentially relevant sales. For example, sales can be screened by date or by destination. As one example, sales occurring prior to a particular cut-off date can be removed. Similarly, bundle prediction can be targeted to a particular end product (or end product family), like a particular airplane model, and sales not related to the target can be removed.

At block 404, the bundle prediction module 220 identifies potentially relevant sales by type. In an embodiment, this can include type of sale, type of customer, or both. For example, historical sales can be designated with a code denoting the type of sale—the code can be used to distinguish between one time sales, repeated sales, etc. Similarly, historical sales can be designated with a code denoting the type of customer purchasing the item, for example airlines, entities focusing on maintenance repair and overhaul (MRO), distributors, brokers, etc. In one example, a sale might be the result of a governmental requirement or recall. This sale would not expect to be repeated, so it can be excluded from the bundle prediction analysis. In an embodiment, sales likely to be repeated are included in the bundle prediction analysis while sales likely to be one-time-only are excluded.

At block 406, the bundle prediction module 220 identifies relevant sales data by the status of the sales. In an embodiment, a given sale has an associated code denoting the phase of the sales process. For example, from the time a customer orders a part, until the time the part ships, there can be many different phases—including, ordering, manufacturing, shipping, etc. In an embodiment, the associated code can be used to include sales that were consummated, and exclude sales that were rejected or cancelled. After block 406, the bundle prediction module 220 outputs the selected historical sales 410.

Figure 5:
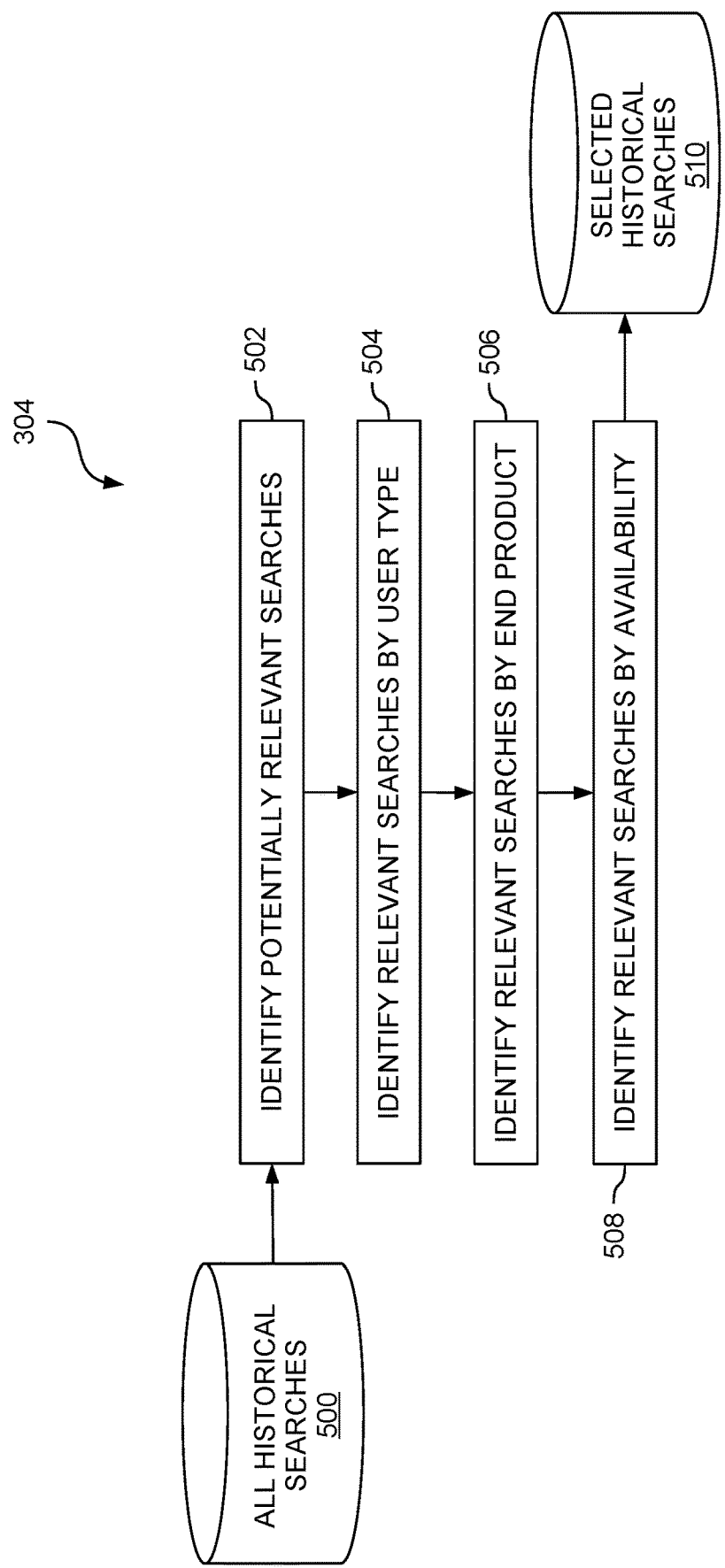
FIG. 5 is a flow chart illustrating identifying relevant historical search data, according to one embodiment described herein.

FIG. 5 is a flow chart illustrating identifying relevant historical search data, according to one embodiment described herein. In an embodiment, FIG. 5 corresponds with block 304 illustrated in FIG. 3. At block 502, the bundle prediction module (e.g., the bundle prediction module 220 illustrated in FIG. 2) receives the historical search data 500

(e.g., the historical searches 176 illustrated in FIG. 4) and identifies potentially relevant searches. For example, searches can be screened by date. As one example, searches occurring prior to a particular cut-off date can be removed.

At block 504, the bundle prediction module 220 identifies relevant searches by user type, customer type, or both. In an embodiment, each search can be associated with an internal (e.g., within the part seller) or external (e.g., customer or potential customer) user. At block 504, the bundle prediction module 220 can remove searches by internal users. In an embodiment, the bundle prediction module 220 distinguishes between users searching with an intent to purchase parts and users searching for research or other purposes. In an embodiment, this can be done based on distinguishing between customer types, for example airlines, MRO, distributors, brokers, etc., as well as (or instead of) internal vs external users. In an embodiment, searches relating to users with an intent other than purchasing parts are excluded. Alternatively, both historical sales data (illustrated in relation to FIG. 4) and historical search data can be identified based on user or customer type, excluding users or customers unlikely to make further purchases.

At block 506, the bundle prediction module 220 identifies relevant search data by end product. In an embodiment, bundle prediction can be targeted to a particular end product (or end product family), like a particular airplane model, and searches not related to the target can be removed. At block 508, the bundle prediction module 220 identifies relevant search data by availability. In an embodiment, the bundle prediction module 220 can remove search data relating to parts that are not active and available for purchase in the part sellers system. After block 508, the bundle prediction module 220 outputs the selected historical searches 510. In an embodiment, the bundle prediction module 220 can combine the selected historical sales 410 and the selected historical searches 510.

Figure 6:
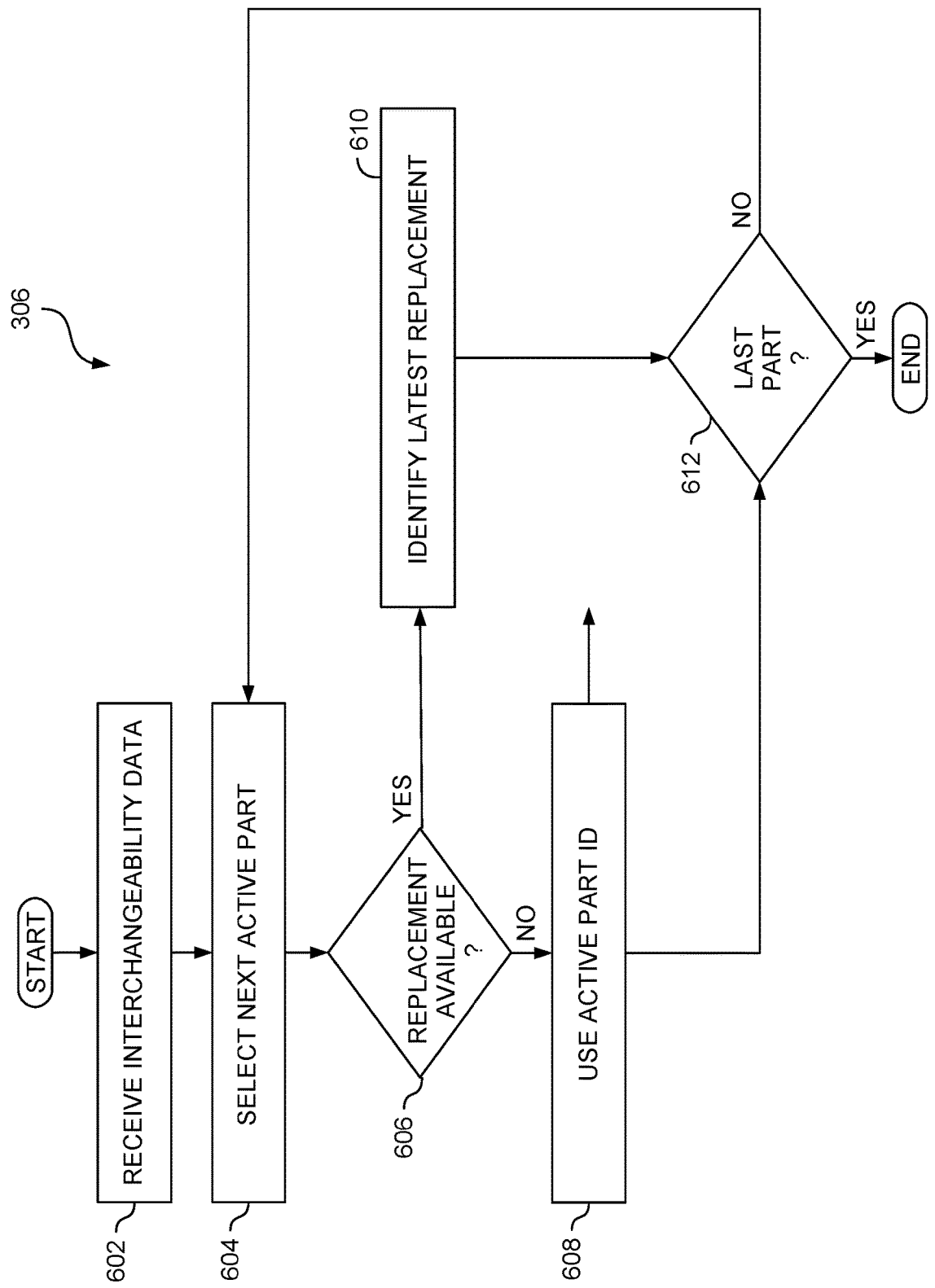
FIG. 6 is a flow chart illustrating accounting for interchangeable spare parts, according to one embodiment described herein.

FIG. 6 is a flow chart illustrating accounting for interchangeable spare parts, according to one embodiment described herein. In an embodiment, FIG. 6 corresponds with block 306 illustrated in FIG. 3. At block 602, the bundle prediction module (e.g., the bundle prediction module 220 illustrated in FIG. 2) receives part interchangeability data (e.g., part interchangeability 172 illustrated in FIG. 1). At block 604, the bundle prediction module 220 selects the next active part. In an embodiment, the bundle prediction module 220 can select from a list of all active parts in the part sellers database. Alternatively, the bundle prediction module 220 can select from active parts present in historical sales or search data, or another data source.

At block 606, the bundle prediction module 220 determines whether a replacement is available for the selected part. In an embodiment, this can be denoted by a field associated with the part in a central database. In an embodiment, the associated field can designate whether a part is one way interchangeable, two way interchangeable, or not interchangeable. A one way interchangeable part can be replaced by a designated part (or parts). A two way interchangeable part can both be replaced by a designated part (or parts), and can serve as a replacement for a designated part (or parts). If the selected part is not interchangeable, at block 608 the bundle prediction module 220 uses the active part identifier and proceeds to block 612.

If the selected part is interchangeable, at block 610 the bundle prediction module 220 identifies the most recent replacement part. In an embodiment, this most recent replacement part can be used to substitute for the active part in a predicted part bundle. In an embodiment, the bundle prediction module 220 identifies the most recent replacement part by examining data relating to a chain of part. For example, the selected part can include data designating a newer replacement (e.g., by part identifier). But this may not be the newest replacement. The bundle prediction module 220 can identify the newer replacement (i.e., the next link in the chain, by part identifier) and look for a designated replacement for that part. If the newer replacement includes its own replacement, the process proceeds, until the bundle prediction module 220 identifies the newest replacement part (e.g., by part identifier). At block 612, the bundle prediction module 220 determines whether all desired active parts have been examined. If so, the flow ends. If not, the bundle prediction module 220 returns to block 604 and selects the next active part.

Figure 7:
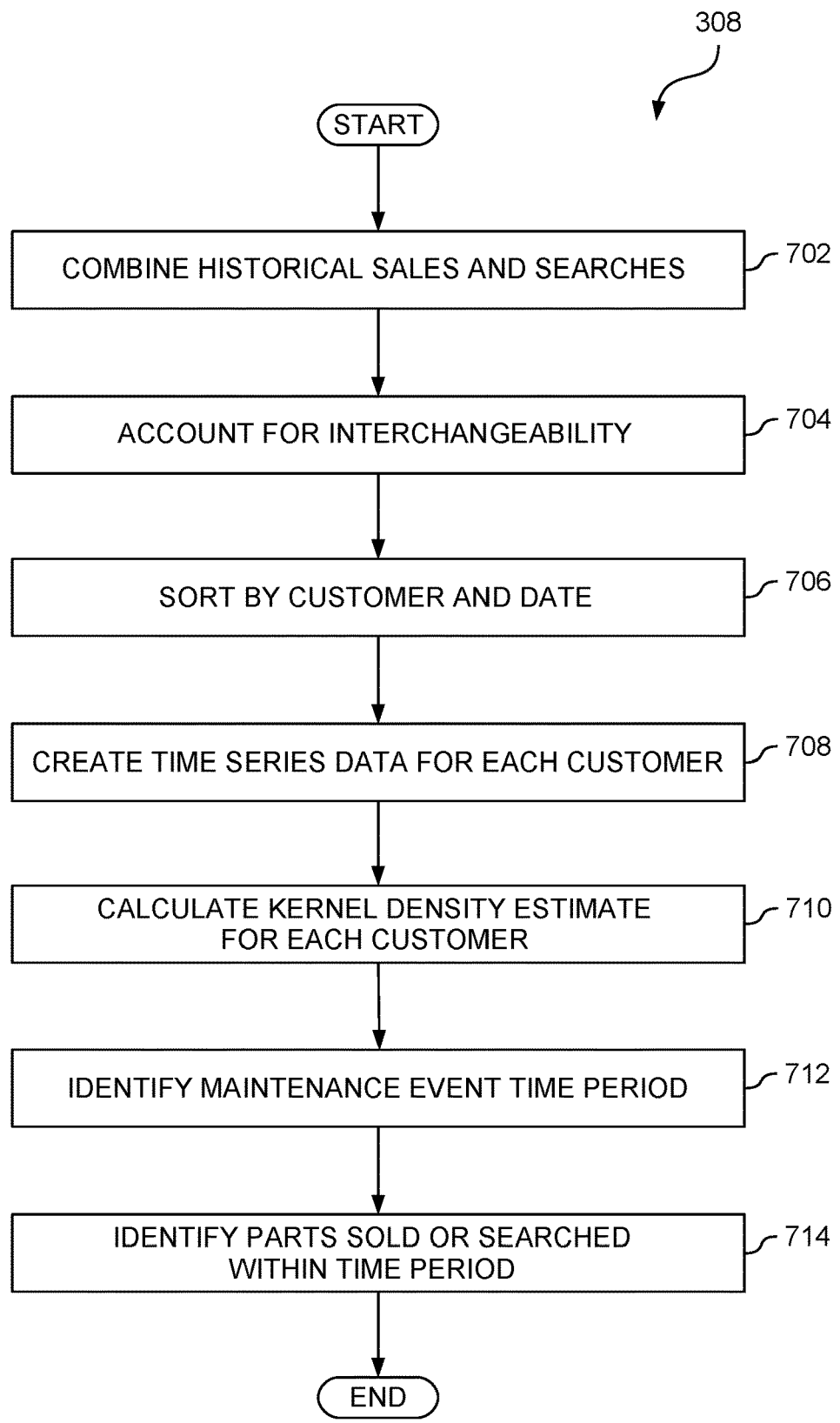
FIG. 7 is a flow chart illustrating determining maintenance events, according to one embodiment described herein.

FIG. 7 is a flow chart illustrating determining maintenance events, according to one embodiment described herein. In an embodiment, FIG. 7 corresponds with block 308 illustrated in FIG. 3. As discussed above, many maintenance events involve purchases, or searches, for parts spread out over multiple transactions. These transactions can be spread out over hours, days, weeks, or even months. FIG. 7 describes one embodiment for identifying which transactions (i.e., sales or searches) relate to the same maintenance event.

At block 702, the bundle prediction module (e.g., the bundle prediction module 220 illustrated in FIG. 2) combines historical sales and historical search data. In an embodiment, the bundle prediction module 220 combines the selected historical sales data 410, illustrated in FIG. 4, with the selected historical search data 510, illustrated in FIG. 5.

At block 704, the bundle prediction module 220 accounts for interchangeability of parts in the combined historical sales and search data. As discussed above in relation to FIG. 6, in an embodiment some of the parts can have interchangeable counterparts. For example, an older part may have been replaced with a new part (e.g., due to changes in governmental regulations or improved manufacturing techniques), and the new part may be interchangeable with the old part. At block 704, bundle prediction module 220 accounts for this by combining the combined historical sales and search data with the interchangeability data. Any parts listed in the combined historical sales and search data that have newer, interchangeable, counterparts, are replaced with the latest counterpart. For example, a historical sale involving an older part with two interchangeable replacements, would have the part number for the original, older, part replaced with the newest interchangeable part. This allows the predicted part bundles to include the newest parts, where possible.

At block 706, the bundle prediction module 220 sorts the data resulting from block 704 by customer and date. In an embodiment, the bundle prediction module 220 sorts the data by customer, and then by date within each customer. Alternatively, the bundle prediction module can sort the data by date, and then by customer. At block 708, the bundle prediction module 220 creates time series data, for each customer, based on the output from block 706. In an embodiment, the bundle prediction module 220 converts the date at which a sale was placed, or a search was conducted, to a number. The bundle prediction module 220 then creates time series data for each customer, using the numbers.

At block 710, the bundle prediction module 220 calculates a kernel density estimate for each customer. Kernel density estimation is a statistical technique that can be used to estimate the underlying probability density function of a dataset. Kernel density estimation is an example of one technique that can be used. Other suitable techniques can also be used. In an embodiment, the bundle prediction module 220 can calculate the kernel density estimation for the time series data relating to each customer, using a bandwidth of 1. Alternatively, other bandwidths could be used.

At block 712, the bundle prediction module 220 identifies the maintenance event time periods for the various customers. In an embodiment, the bundle prediction module 220 can identify the minimum points along the kernel density estimation calculated at block 710. The bundle prediction module 220 can then identify two consecutive minimum points along the density estimation. These are the likely boundaries of the time period (e.g., the starting point in time and the ending point in time), for a given maintenance event.

At block 714 the bundle prediction module 220 identifies parts sold or searched for within the time periods identified at block 712. These are the parts related to the event occurring during that time period. For example, at block 712 the bundle prediction module 220 can determine Date A as the likely beginning of a given time period and Date B as the likely end. At block 714, the bundle prediction module identifies parts sold, or search for, between Date A and Date B, using the combined historical sales and search data.

Figure 8:
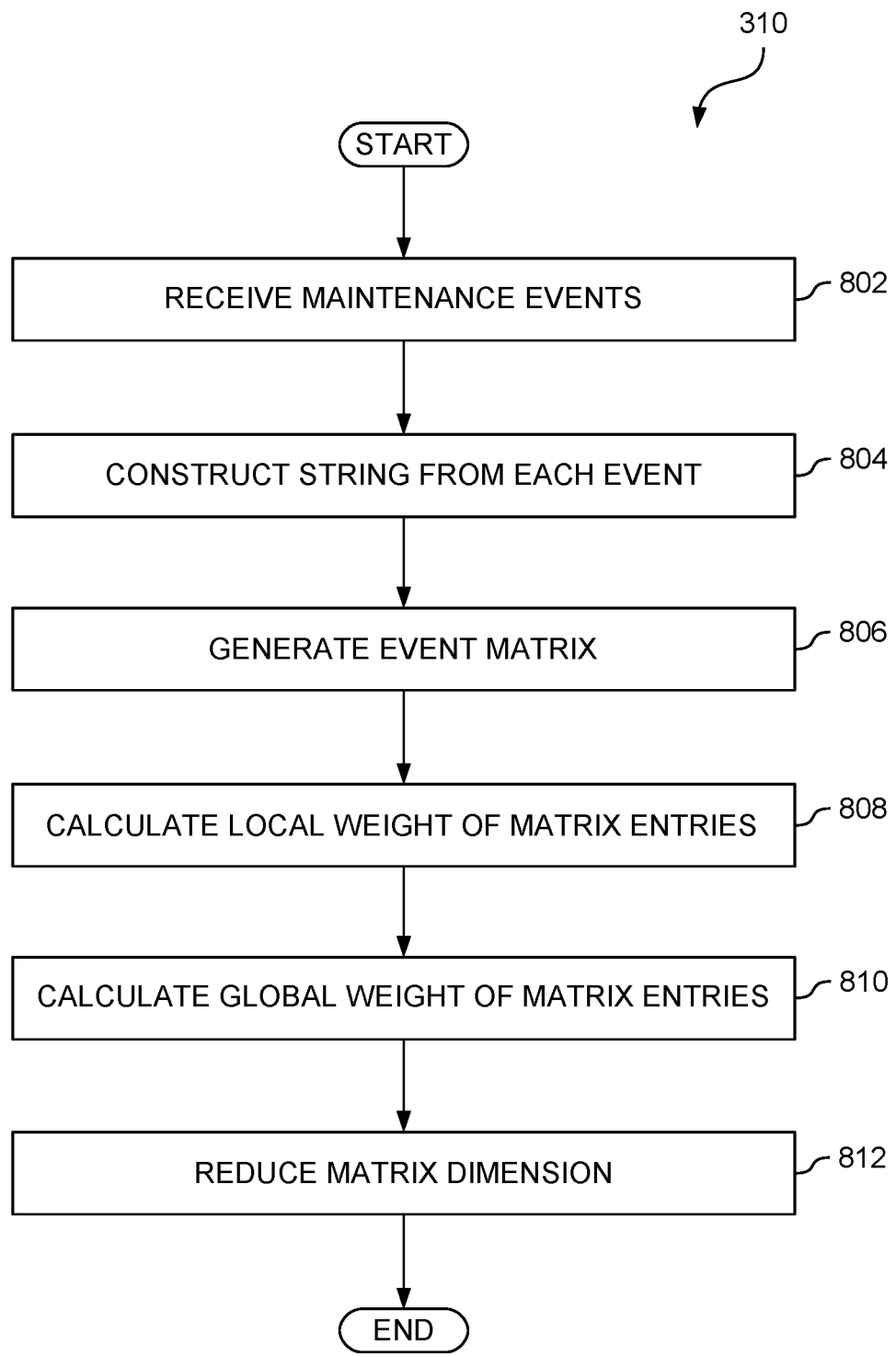
FIG. 8 is a flow chart illustrating generating a matrix of part relationships, according to one embodiment described herein.

FIG. 8 is a flow chart illustrating generating a matrix of part relationships, according to one embodiment described herein. In an embodiment, FIG. 8 corresponds with block 310 illustrated in FIG. 3. At block 802, the bundle prediction module (e.g., the bundle prediction module 220 illustrated in FIG. 2) receives the maintenance events identified in FIG. 7. At block 804, the bundle prediction module 220 constructs a string from each event. In an embodiment, the string includes the part numbers corresponding to the event (e.g., as identified in FIG. 7), with the part numbers separated with a delimiter, like a space, tab, or comma.

Figure 10:
FIG. 10 is an illustration of an example matrix of part relationships, according to one embodiment described herein.

At block 806, the bundle prediction module 220 constructs a matrix corresponding to the event strings constructed at block 804. In an embodiment, this can be a two dimensional binary matrix (e.g., a two dimensional binary array), with one dimension representing the identified events and the other dimension representing the parts included in each identified event. One example is illustrated in FIG. 10, discussed further below. Alternatively, this can be a matrix with a different number of dimensions, and the values in the matrix can be non-binary (e.g., integers, real numbers, booleans, a defined type, etc.).

At block 808, the bundle prediction module 220 calculates the local weight of the matrix entries. The local weight is used to identify the contribution of each part to the maintenance event including that part. In an embodiment, a matrix entry corresponds to a particular part and a particular event. The local weight of that matrix entry represents the contribution of that particular part to that particular event (e.g., the importance of that part to that event).

At block 810, the bundle prediction module 220 calculates the global weight of each part included in the matrix. The global weight is used to identify the contribution of a given part to all of the identified events (e.g., the importance of that part to all the events). In an embodiment, the global weight can be calculated using the formula:

$$globalWeight(part\_x) = \log\left(\frac{\text{\# events including part\_x}}{\text{\# total events}} + 1\right).$$

At block 812, the bundle prediction module 220 reduces the matrix dimension. In an embodiment, the bundle prediction module 220 can reduce the complexity of predicting part bundles by removing from the matrix less important values. This allows the bundle prediction module 220 to focus on the more important value, and reduces noise. In an embodiment, the bundle prediction module 220 multiplies the calculated weight matrices from blocks 808 and 810 together to generate a resultant matrix. The bundle prediction module 220 then calculates the singular-value decomposition (SVD) of the resultant matrix. The bundle prediction module 220 reduces the dimension of the matrix from the SVD for eigenvalues less than a pre-determined value. Using SVD, as discussed above, is one example of a technique for reducing the matrix. Alternatively, other techniques could be used instead.

Figure 9:
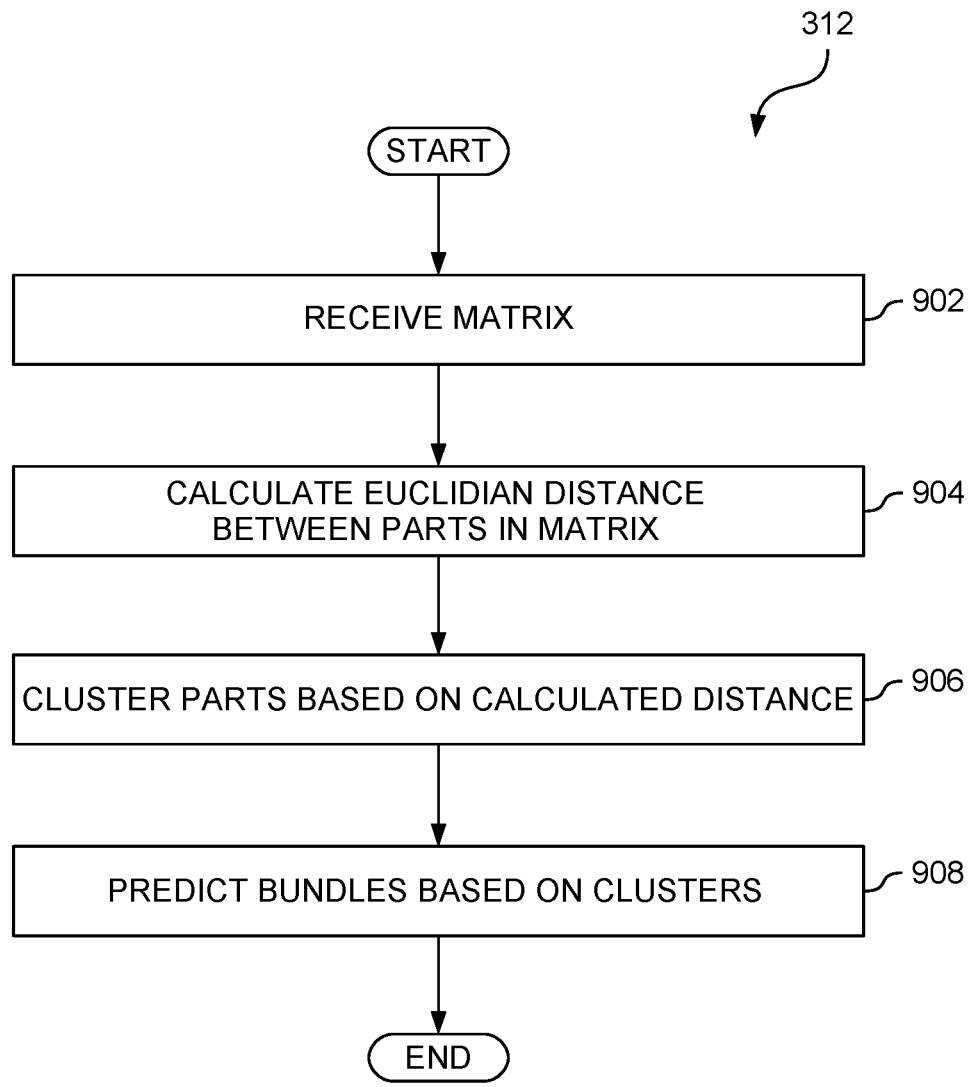
FIG. 9 is a flow chart illustrating intelligent prediction of part bundles, according to one embodiment described herein.

FIG. 9 is a flow chart illustrating intelligent prediction of part bundles, according to one embodiment described herein. In an embodiment, FIG. 9 corresponds with block 312 illustrated in FIG. 3. At block 902, the bundle prediction module (e.g., the bundle prediction module 220 illustrated in FIG. 2) receives the matrix (e.g., the matrix generated using the techniques illustrated in FIG. 8, above). At block 904, the bundle prediction module 220 calculates the Euclidian distance between parts in the matrix.

At block 906, the bundle prediction module 220 clusters the parts in the matrix, using the Euclidian distance calculated at block 904. In an embodiment, the bundle prediction module 220 performs hierarchical clustering and uses Ward's minimum variance method for the clustering. Alternatively, another method of hierarchical clustering can be used, or another form of clustering can be used. At block 908, the bundle prediction module 220 predicts the bundles by collecting the clustered part numbers into bundles.

FIG. 10 is an illustration of an example matrix 1000 of part relationships, according to one embodiment described herein. In an embodiment, the illustrated matrix in FIG. 10 is an example of a matrix generated according to techniques illustrated in FIG. 8. In an embodiment, the illustrated matrix can be implemented using a two dimensional binary array. The embodiment illustrated in FIG. 10 is merely an example of a possible matrix—many other formats and types of matrices can be used. In the matrix 1000, the rows represent parts (e.g., identified by part number) and the columns represent maintenance events (e.g., identified according to techniques illustrated in FIG. 7). In an embodiment, each part included in at least one event is included as a row in the matrix 1000. Alternatively, each active part available for sale by the part seller is included as a row in the matrix 1000.

Each entry in the matrix 1000 represents whether the event in that column includes the part in that row. A binary "1" signifies that the event in that column includes the part in that row, while a binary "0" signifies that the event in that column does not include that part. For example, Event A includes parts 1, 3, 6, and 7, but does not include parts 2, 4, 5, and 8. Event B includes parts 3, 4, 5, 6, and 7, but does not include parts 1 and 8. In an embodiment, as discussed above, the matrix 1000 can be used to cluster parts and predict bundles of parts.

After a bundle prediction module (e.g., the bundle prediction module 220) predicts a bundle of parts (e.g., as described in relation to block 312 in FIG. 3), the bundle can be sent to a customer. In an embodiment, the associated price can also be sent to the customer (e.g., a price generated using the bundle pricing module 230). In an embodiment, the bundle prediction module can generate a user interface for display of the bundle information to the customer—for example, the bundle prediction module can generate a webpage (e.g., and HTML web page), a Javascript module, an XML module, or another suitable interface description. The bundle prediction module (or another suitable module) can provide this user interface description to a customer for display by the customer. For example, the bundle prediction module can transmit the user interface description (e.g., the HTML, Javascript, or XML module) over a communication network to the customer for display by a customer's web browser or application. Further, as another example, the bundle prediction module (or another suitable module) can communicate with a customer device over a communication network (e.g., using a suitable Application Programming Interface (API)).

In an embodiment, the customer can select a desired bundle for purchase (e.g., using the user interface). The customer's computer, or other electronic device, can transmit a response signal to the bundle prediction server (e.g., the bundle prediction server 200) or another suitable server. After receiving the response signal, the server can fulfil the purchase. For example, the server can reserve the parts in the bundle in inventory, to facilitate fulfilment. The server can further identify the destination for the parts in the bundle, and can trigger processing and shipment of the parts. In an embodiment, the server can fulfil the order automatically. Alternatively, the server can alert fulfilment personnel (e.g., using a user interface) and provide the necessary information to allow the fulfilment personnel to obtain and ship the purchased parts. The parts may then be shipped automatically or by fulfillment personnel.

In an embodiment, purchase of the bundled parts can be done through a user interface provided to customers. Alternatively, purchase could be done automatically. For example, a customer could provide pre-approval for a seller to predict parts that will likely be necessary at a particular point in time, and to automatically generate a bundle and purchase the parts. In an embodiment, this pre-approval could be further tied to a desired or maximum price for the bundle. The customer could be provided with the ability to approve or reject the purchase prior to completion, or the purchase could be fully automated. In an embodiment, a customer could further provide approval for automatic purchase of a predicted bundle when the customer seeks to purchase an individual part. For example, a customer could seek purchase of a particular part, and the system could identify a predicted bundle associated with that part and automatically purchase the bundle. This could be done with customer approval at the time of purchase, or automatically based on pre-approval. In an embodiment, the accuracy of the predicted bundles can encourage a customer to pre-approve automatic bundle prediction for future purchases.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present disclosure may be written in any combination of one or more programming languages, including an object oriented programming language such as Java, Smalltalk, C++, R, SAS or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., bundle prediction server 200) or related data available in the cloud. For example, one or both of the bundle prediction module 220 and the bundle pricing module 230 could execute on a computing system in the cloud. In such a case, each module could access data stored at a storage location in the cloud (e.g., historical sales and search data), and could store associated data in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A computer-implemented method for intelligently predicting bundles of replacement parts, the method comprising:
    determining, using a computer processor, a plurality of maintenance events for a plurality of replacement parts, based on historical data related to the plurality of replacement parts, wherein each maintenance event of the plurality of maintenance events corresponds with one or more of the replacement parts, the determining comprising:
        identifying, using the computer processor, one or more replacement parts for a maintenance event, based on one or more replacement part events occurring within a time period related to the maintenance event;
    generating, using the computer processor, a plurality of clusters of replacement parts based on the plurality of maintenance events; and
    predicting, using the computer processor, a plurality of bundles of replacement parts, based on the clusters, wherein each bundle comprises a plurality of replacement parts.

2. The method of claim 1, wherein the one or more replacement part events comprise at least one of sales of replacement parts or electronic searches for replacement parts, and wherein the time period relating to the maintenance event comprises a time period relating to a starting point in time for the maintenance event and an ending point in time for the maintenance event.

3. The method of claim 1, wherein determining, using the computer processor, the plurality of maintenance events for the plurality of replacement parts further comprises:
    generating time series data related to the historical data; and
    calculating a kernel density estimate related to the time series data, wherein the time period related to the maintenance event is based on the kernel density estimate.

4. The method of claim 1, further comprising:
    identifying, using the computer processor, a plurality of interchangeable parts among the plurality of replacement parts, wherein the plurality of maintenance events is based on the plurality of interchangeable parts.

5. The method of claim 4, further comprising:
    determining, using the computer processor, for a first interchangeable part of the plurality of interchangeable parts, an original part identifier and a most recent part identifier, wherein the plurality of maintenance events uses the most recent part identifier in place of the original part identifier.

6. The method of claim 1, further comprising:
    generating, using the computer processor, a two dimensional array relating to the plurality of maintenance events and the plurality of replacement parts,
    wherein generating, using the computer processor, the plurality of clusters of replacement parts is based on the two dimensional array.

7. The method of claim 6, wherein the two dimensional array is a binary array.

8. The method of claim 6, further comprising:
    calculating a local weight for a plurality of entries in the two dimensional array;
    calculating a global weight for the plurality of entries in the two dimensional array; and
    reducing a dimension of the two dimensional array, based at least in part on the calculated local weights and global weights, wherein generating, using the computer processor, the plurality of clusters of replacement parts is based on the reduced two dimensional array.

9. The method of claim 1, further comprising:
    determining a price for a first bundle of the plurality of bundles of replacement parts, based at least in part on pre-determined prices for each part in the first bundle, wherein the price for the first bundle is lower than combined pre-determined prices for each part in the first bundle.

10. The method of claim 9, wherein the price for the first bundle is determined automatically, using the computer processor, and wherein the price for the first bundle is based on one or more characteristics of the parts in the first bundle.

11. A system, comprising:
- a processor; and
- a memory storing a program, which, when executed on the processor, performs an operation, the operation comprising:
    - determining a plurality of maintenance events for a plurality of replacement parts, based on historical data related to the plurality of replacement parts, wherein each maintenance event of the plurality of maintenance events corresponds with one or more of the replacement parts, the determining comprising:
        - identifying one or more replacement parts for a maintenance event, based on one or more replacement part events occurring within a time period related to the maintenance event;
        - generating a plurality of clusters of replacement parts based on the plurality of maintenance events; and
        - predicting a plurality of bundles of replacement parts, based on the clusters, wherein each bundle comprises a plurality of replacement parts.

12. The system of claim 11, wherein the one or more replacement part events comprise at least one of sales of replacement parts or electronic searches for replacement parts, and wherein the time period relating to the maintenance event comprises a time period relating to a starting point in time for the maintenance event and an ending point in time for the maintenance event.

13. The system of claim 11, wherein determining the plurality of maintenance events for the plurality of replacement parts further comprises:
- generating time series data related to the historical data; and
- calculating a kernel density estimate related to the time series data, wherein the time period related to the maintenance event is based on the kernel density estimate.

14. The system of claim 11, the operation further comprising:
- identifying a plurality of interchangeable parts among the plurality of replacement parts, wherein the plurality of maintenance events is based on the plurality of interchangeable parts.

15. The system of claim 11, the operation further comprising:
- determining a price for a first bundle of the plurality of bundles of replacement parts, based at least in part on pre-determined prices for each part in the first bundle, wherein the price for the first bundle is lower than combined pre-determined prices for each part in the first bundle.

16. The system of claim 15, wherein the price for the first bundle is determined automatically and wherein the price for the first bundle is based on one or more characteristics of the parts in the first bundle.

17. A computer program product for intelligently predicting bundles of replacement parts, the computer program product comprising:
- a non-transitory computer-readable storage medium having computer-readable program code embodied therewith, the computer-readable program code executable by one or more computer processors to perform an operation, the operation comprising:
    - determining a plurality of maintenance events for a plurality of replacement parts, based on historical data related to the plurality of replacement parts, wherein each maintenance event of the plurality of maintenance events corresponds with one or more of the replacement parts, the determining comprising:
        - identifying one or more replacement parts for a maintenance event, based on one or more replacement part events occurring within a time period related to the maintenance event;
        - generating a plurality of clusters of replacement parts based on the plurality of maintenance events; and
        - predicting a plurality of bundles of replacement parts, based on the clusters, wherein each bundle comprises a plurality of replacement parts.

18. The computer program product of claim 17, the operation further comprising:
- generating a two dimensional array relating to the plurality of maintenance events and the plurality of replacement parts, wherein generating the plurality of clusters of replacement parts is based on the two dimensional array.

19. The computer program product of claim 17, the operation further comprising:
- determining a price for a first bundle of the plurality of bundles of replacement parts, based at least in part on pre-determined prices for each part in the first bundle, wherein the price for the first bundle is lower than combined pre-determined prices for each part in the first bundle.

20. The computer program product of claim 19, wherein the price for the first bundle is determined automatically and wherein the price for the first bundle is based on one or more characteristics of the parts in the first bundle.

* * * * *